(12) United States Patent
Chan et al.

(10) Patent No.: US 11,703,629 B1
(45) Date of Patent: Jul. 18, 2023

(54) LIGHT GUIDE STRUCTURE, MANUFACTURING METHOD AND BACKLIGHT MODULE WITH LIGHT GUIDE STRUCTURE

(71) Applicant: Primax Electronics Ltd., Taipei (TW)

(72) Inventors: Wei-Ping Chan, Taipei (TW); Wei-Chiang Huang, Taipei (TW); Hung-Wei Kuo, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 17/749,480

(22) Filed: May 20, 2022

(30) Foreign Application Priority Data

Apr. 19, 2022  (TW) .................................. 111114892

(51) Int. Cl.
*F21V 8/00* (2006.01)
*B29D 11/00* (2006.01)

(52) U.S. Cl.
CPC ........ *G02B 6/005* (2013.01); *B29D 11/00875* (2013.01); *B29D 11/00932* (2013.01); *G02B 6/0023* (2013.01); *G02B 6/0055* (2013.01); *G02F 2201/08* (2013.01)

(58) Field of Classification Search
CPC ............ B29D 11/0087; B29D 11/0093; G02B 6/005; G02F 2201/08
See application file for complete search history.

(56) References Cited

U.S. PATENT DOCUMENTS

| | | | |
|---|---|---|---|
| 2014/0369067 A1* | 12/2014 | Chen | G02B 6/0031 362/606 |
| 2017/0023729 A1* | 1/2017 | Kuo | B29C 59/04 |
| 2017/0045676 A1* | 2/2017 | Zhou | G02B 6/0053 |
| 2019/0146145 A1* | 5/2019 | Gu | G02B 6/0088 362/607 |

* cited by examiner

*Primary Examiner* — Keith G. Delahoussaye
(74) *Attorney, Agent, or Firm* — Kirton McConkie; Evan R. Witt

(57) ABSTRACT

A light guide structure for a backlight module is provided. A light source of the backlight module emits a light beam. The light beam is guided by the light guide structure. The light guide structure includes a plate body and a light-shielding layer. The plate body includes a light-transmissible plate, a light-guiding plate and a reflecting plate. The light-guiding plate has a lateral surface. The light-transmissible plate has a light-transmissible plate lateral surface. The reflecting plate has a reflecting plate lateral surface. The lateral surface of the light-guiding plate, the light-transmissible plate lateral surface and the reflecting plate lateral surface are collaboratively formed as a plate body lateral surface. The plate body lateral surface is covered by the light-shielding layer. The light beam from the light source is blocked by the light-shielding layer.

3 Claims, 7 Drawing Sheets

LIGHT GUIDE STRUCTURE, MANUFACTURING METHOD AND BACKLIGHT MODULE WITH LIGHT GUIDE STRUCTURE

FIELD OF THE INVENTION

The present invention relates to a backlight module with a light guide structure and a manufacturing method of the light guide structure.

BACKGROUND OF THE INVENTION

With increasing development of science and technology, a variety of electronic devices are designed in views of convenience and user-friendliness. For helping the user well operate the electronic devices, the electronic devices are gradually developed in views of humanization. The common electronic devices include for example notebook computers, mobile phones, satellite navigation devices, or the like. Recently, the storage capacity and the processor's computing performance for these electronic devices are largely enhanced, and thus their functions become more powerful and complicated. Generally, a mouse, a trackball, a keyboard device or a touchpad module is used as an input device of the electronic device for controlling the operations of the electronic device. Consequently, the electronic device can be operated more efficiently.

Recently, are the consumers' visual appeals are increased, a luminous input device has gradually developed in the industry. Generally, the luminous keyboard device or the luminous touchpad module is equipped with a blacklight module as the light source. FIG. 1 is a schematic cross-sectional view illustrating the structure of a conventional backlight module. As shown in FIG. 1, the blacklight module 1 comprises a light-transmissible plate 11, a light-guiding plate 12, a reflecting plate 13 and a light source 14. The light-transmissible plate 11, the light-guiding plate 12 and the reflecting plate 13 are stacked on each other and sequentially arranged from top to bottom. The light-guiding plate 12 comprises a light input surface 121, a light exit surface 122, a bottom surface 123 and a lateral surface 124. The light source 14 is located beside the light input surface 121 of the light-guiding plate 12. After a light beam emitted by the light source 14 is introduced into the light-guiding plate 12 through the light input surface 121 of the light-guiding plate 12, the light beam is guided by the light-guiding plate 12 and exited from the light exit surface 122. Consequently, the keyboard device or the touchpad module generate a luminous effect through the blacklight module 1. However, after the light beam is introduced into the light-guiding plate 12, a portion of the light beam is exited from the lateral surface 124 of the light-guiding plate 12. Consequently, a light spot is formed on the lateral surface 124 of the light-guiding plate 12. The light spot may adversely affect the appearance of the keyboard device or the touchpad module. In order to avoid the leakage of the light beam from the lateral surface 124 of the light-guiding plate 12, there are usually two light-shielding designs for the conventional backlight module.

FIG. 2 is a cross-sectional view illustrating a light-shielding design for the backlight module as shown in FIG. 1. The light-shielding design for the backlight module 1a will be described as follows. Firstly, an edge of the light-transmissible plate 11 and an edge of the reflecting plate 13 are pressurized. Consequently, the edge of the light-transmissible plate 11 and the edge of the reflecting plate 13 are bent toward each other. When the edge of the light-transmissible plate 11 and the edge of the reflecting plate 13 are attached on each other, an edge covering region R is formed. Due to the edge covering region R, the lateral surface 124 of the light-guiding plate 12 is covered between the light-transmissible plate 11 and the reflecting plate 13. Consequently, the light beam is not leaked from the lateral surface 124 of the light-guiding plate 12.

FIG. 3 is a cross-sectional view illustrating another light-shielding design for the backlight module as shown in FIG. 1. In the light-shielding design for the backlight module 1b, a black mylar layer 15 is located beside the lateral surface 124 of the light-guiding plate 12 to avoid the leakage of the light beam from the lateral surface 124 of the light-guiding plate 12.

However, the conventional light-shielding designs still have some drawbacks. In the light-shielding design of FIG. 2, one of the light-transmissible plate 11 and the reflecting plate 13 needs to be made of soft material. Consequently, the structural strength of the overall backlight module 1 is largely reduced. Moreover, each of the bent edges of the light-transmissible plate 11 and the reflecting plate 13 needs to be longer than 3 centimeters. If the lengths of the bent edges of the light-transmissible plate 11 and the reflecting plate 13 are small, the bent edges of the light-transmissible plate 11 and the reflecting plate 13 are possibly separated from each other.

In the light-shielding design of FIG. 3, the black mylar layer 15 located beside the lateral surface 124 of the light-guiding plate 12 needs to have a specified width. If the width of the black mylar layer 15 is insufficient, the black mylar layer 15 is possibly peeled off. However, if the width of the black mylar layer 15 is too large, the width of the edge of the backlight module 1 is increased. Under this circumstance, the appearance of the backlight module 1 is adversely affected, and the assembling complexity of the backlight module 1 is largely increased.

Therefore, there is a need of providing an improved backlight module and an associated light guide structure in order to overcome the drawbacks of the conventional technologies.

SUMMARY OF THE INVENTION

An object of the present invention provides a light guide structure with the function of preventing from light leakage.

Another object of the present invention provides a manufacturing method of a light guide structure. The light guide structure fabricated by the manufacturing method has the function of preventing from light leakage.

A further object of the present invention provides a backlight module with a light guide structure. The light guide structure has the function of preventing from light leakage.

The other objects and advantages of the present invention will be understood from the disclosed technical features.

In accordance with an aspect of the present invention, a light guide structure for a backlight module is provided. The backlight module includes a light source. The light source emits a light beam. The light beam is guided by the light guide structure. The light guide structure includes a plate body and a light-shielding layer. The plate body includes a light-transmissible plate, a light-guiding plate and a reflecting plate, which are stacked on each other and sequentially arranged from top to bottom. The light-guiding plate has a lateral surface. The light-transmissible plate has a light-transmissible plate lateral surface. The reflecting plate has a reflecting plate lateral surface. The lateral surface of the light-guiding plate, the light-transmissible plate lateral surface and the reflecting plate lateral surface are collaboratively formed as a plate body lateral surface. The light-shielding layer covers the plate body lateral surface. The light beam from the light source is blocked by the light-shielding layer. Consequently, the light beam is not exited from the lateral surface of the light-guiding plate.

In an embodiment, the light-guiding plate further includes a light input surface, a light exit surface and a bottom surface. The light exit surface and the bottom surface of the light-guiding plate are aligned with each other. The light input surface is located beside and arranged between the light exit surface, the bottom surface and the lateral surface of the light-guiding plate. The light source is located beside the light input surface. After the light beam emitted by the light source is introduced into the light-guiding plate through the light input surface, the light beam is exited from the light exit surface.

In an embodiment, the light-transmissible plate further includes a light-transmissible plate top surface, and the light-transmissible plate top surface is located beside the light-transmissible plate lateral surface and aligned with the light exit surface of the light-guiding plate. The reflecting plate further includes a reflecting plate bottom surface, and the reflecting plate bottom surface is located beside the reflecting plate lateral surface and aligned with the bottom surface of the light-guiding plate. A portion of light-transmissible plate top surface and a portion of the reflecting plate bottom surface are covered by the light-shielding layer.

In an embodiment, the light-shielding layer includes a lateral part, an upper part and a lower part. The upper part of the light-shielding layer is connected with a first end of the lateral part and extended in a direction toward the plate body. The lower part is connected with a second end of the lateral part and extended in the direction toward the plate body. The plate body lateral surface is covered by the lateral part of the light-shielding layer. The portion of the light-transmissible plate top surface is covered by the upper part of the light-shielding layer. The portion of the reflecting plate bottom surface is covered by the lower part of the light-shielding layer.

In an embodiment, a width of each of the upper part and the lower part of the light-shielding layer is larger than or equal to 0.1 millimeter and smaller than or equal to 0.25 millimeter.

In an embodiment, a thickness of each of the lateral part, the upper part and the lower part of the light-shielding layer is larger than or equal to 6 micrometers and smaller than or equal to 12 micrometers.

In an embodiment, the light-shielding layer is formed on the plate body lateral surface by using an ink printing process or a paint spraying process.

In an embodiment, the light-shielding layer is a light-curable ink layer or a heat-curable ink layer.

In accordance with another aspect of the present invention, a manufacturing method of a light guide structure is provided. The manufacturing method includes the following steps. Firstly, a composite plate structure is provided. The composite plate structure includes a light-transmissible plate, a light-guiding plate and a reflecting plate, which are stacked on each other and sequentially arranged from top to bottom. Then, the composite plate structure is cut into at least two plate bodies. The plate bodies have respective plate body lateral surfaces. There is a gap between the plate body lateral surfaces of every two adjacent plate bodies. Each plate body lateral surface is defined by a lateral surface of the light-guiding plate, a light-transmissible plate lateral surface of the light-transmissible plate and a reflecting plate lateral surface of the reflecting plate collaboratively. Then, a light-shielding layer is formed in the gap, and the plate body lateral surface of each plate body is covered by the light-shielding layer. Consequently, the at least two plate bodies are connected with each other through the light-shielding layer. Then, the light-shielding layer. Consequently, the at least two plate bodies are separated from each other, and the plate body lateral surface of each plate body is covered by a portion the light-shielding layer.

In an embodiment, the light-shielding layer is a light-curable ink layer or a heat-curable ink layer. Before the light-shielding layer is formed in the gap, a light-shielding layer formation region is defined between the plate bodies, and the gap is included in the light-shielding layer formation region. When a material of the light-shielding layer is in an uncured state, the material of the light-shielding layer flows to the light-shielding layer formation region, so that the plate body lateral surface of each plate body is covered by the light-shielding layer.

In an embodiment, the light-guiding plate further includes a light input surface, a light exit surface and a bottom surface. The light exit surface and the bottom surface of the light-guiding plate are aligned with each other, and the light input surface is located beside and arranged between the light exit surface, the bottom surface and the lateral surface of the light-guiding plate. The light-transmissible plate further includes a light-transmissible plate top surface, and the light-transmissible plate top surface is located beside the light-transmissible plate lateral surface and aligned with the light exit surface of the light-guiding plate. The reflecting plate further includes a reflecting plate bottom surface, and the reflecting plate bottom surface is located beside the reflecting plate lateral surface and aligned with the bottom surface of the light-guiding plate. A portion of light-transmissible plate top surface and a portion of the reflecting plate bottom surface are included in the light-shielding layer formation region. When the material of the light-shielding layer is in the uncured state, the material of the light-shielding layer flows to the light-shielding layer formation region. Consequently, the plate body lateral surface, the portion of light-transmissible plate top surface and the portion of the reflecting plate bottom surface in each plate body are covered by the light-shielding layer.

In an embodiment, the light-shielding layer is formed on the plate body lateral surface by using an ink printing process or a paint spraying process.

In accordance with a further aspect of the present invention, a backlight module is provided. The backlight module includes a light source and a light guide structure. The light source emits a light beam. The light beam is guided by the light guide structure. The light guide structure includes a plate body and a light-shielding layer. The plate body includes a light-transmissible plate, a light-guiding plate and a reflecting plate, which are stacked on each other and sequentially arranged from top to bottom. The light-guiding plate has a lateral surface. The light-transmissible plate has a light-transmissible plate lateral surface. The reflecting plate has a reflecting plate lateral surface. The lateral surface of the light-guiding plate, the light-transmissible plate lateral surface and the reflecting plate lateral surface are collaboratively formed as a plate body lateral surface. The light-shielding layer covers the plate body lateral surface. The light beam from the light source is blocked by the light-shielding layer. Consequently, the light beam is not exited from the lateral surface of the light-guiding plate.

From the above descriptions, the present invention provides the backlight module. The backlight module comprises the light guide structure and the light-shielding layer. The light-shielding layer is formed on the plate body of the light guide structure. In addition, the plate body lateral surface, a portion of the light-transmissible plate top surface and a portion of the reflecting plate bottom surface are covered by the light-shielding layer. Due to this structural design, the light guide structure can effectively prevent the light beam from leaking from the plate body. Moreover, since the light guide structure is helpful for increasing the overall structural strength, the light-shielding layer will not be peeled off from the plate body. In the manufacturing method of the light guide structure, the light-transmissible plate, the light-guiding plate and the reflecting plate are firstly assembled as the composite plate structure and then the subsequent steps are performed. Consequently, the production yield and the production efficiency are largely increased. By using the manufacturing method of the light guide structure, the width of the light-shielding layer can be controlled to be in the range between 0.1 millimeter and 0.25 millimeter, and the thickness of the light-shielding layer can be controlled to be in the range between 6 micrometers and 12 micrometers. Consequently, after the backlight module is installed in an electronic device, the appearance of the electronic device will not be affected by the light-shielding layer of the light guide structure. The backlight module of the present invention can be applied to the components of a keyboard device, a touchpad, a notebook computer or an intelligent appliance that has the illuminating demand.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
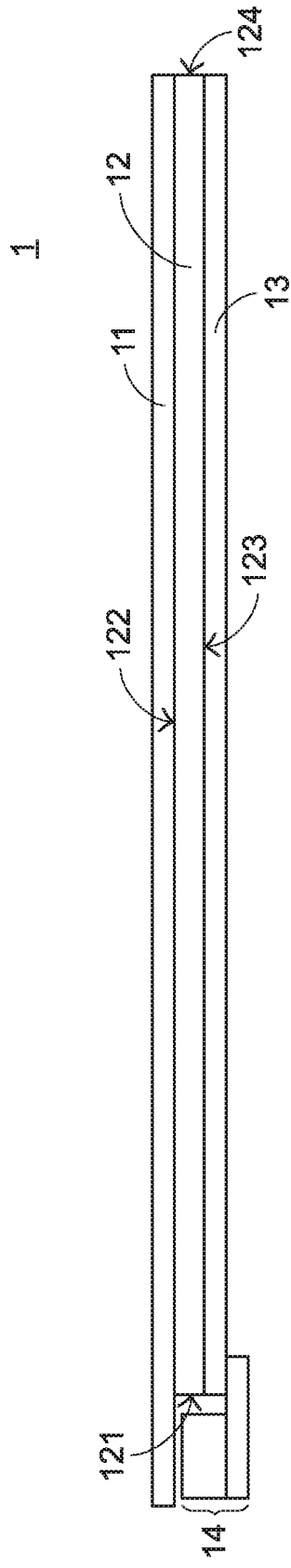
FIG. 1 is a schematic cross-sectional view illustrating the structure of a conventional backlight module.
Figure 2:
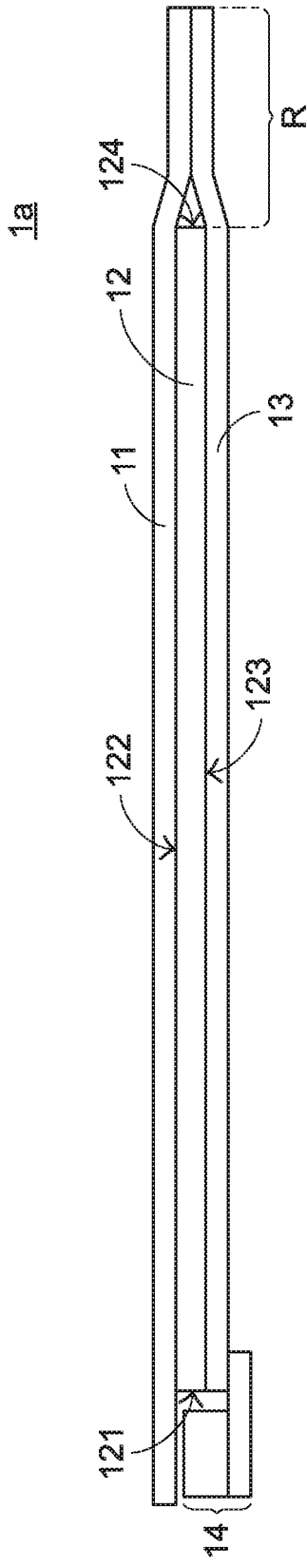
FIG. 2 is a cross-sectional view illustrating a light-shielding design for the backlight module as shown in FIG. 1.
Figure 3:
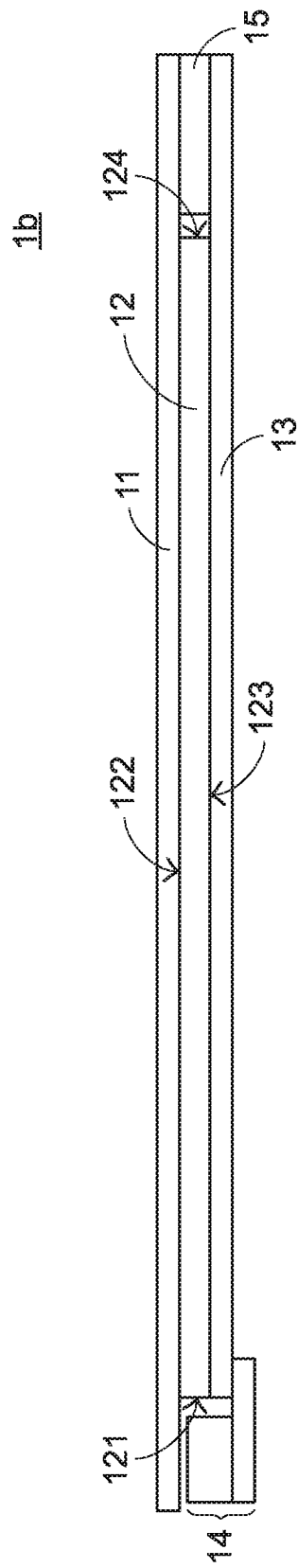
FIG. 3 is a cross-sectional view illustrating another light-shielding design for the backlight module as shown in FIG. 1.
Figure 4:
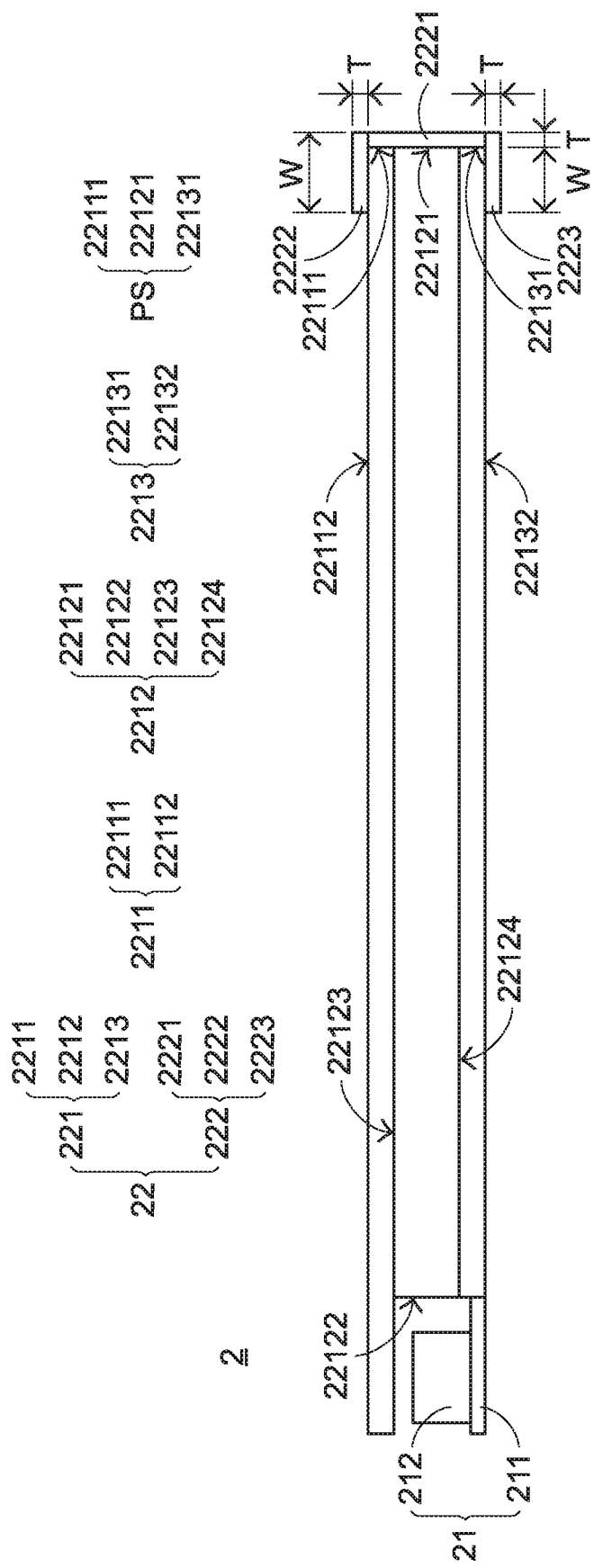
FIG. 4 is a schematic cross-sectional view illustrating a backlight module according to an embodiment of the present invention
Figure 5:
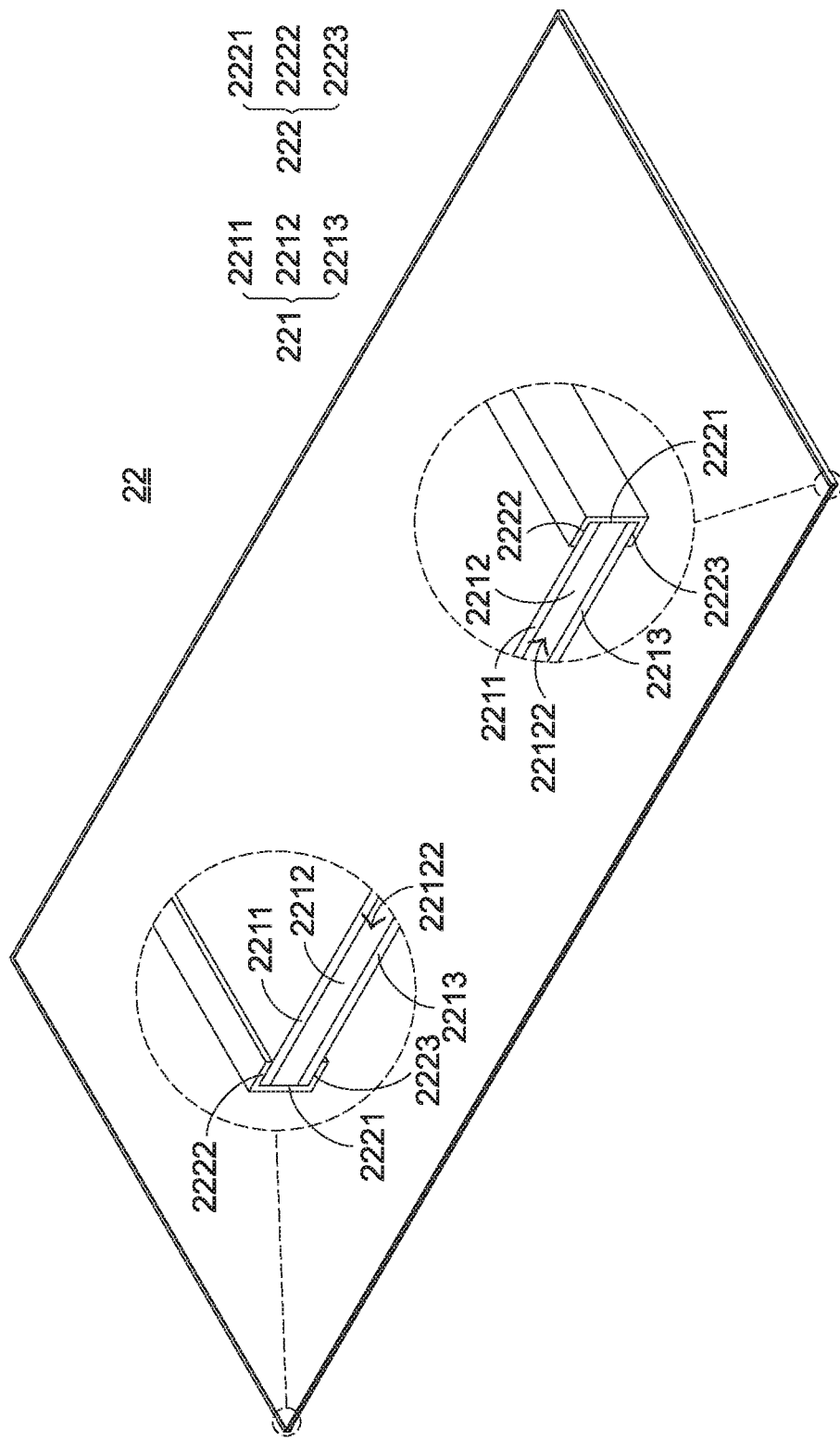
FIG. 5 is schematic perspective view illustrating the light guide structure of the backlight module as shown in FIG. 4

Please refer to FIGS. 4 and 5. FIG. 4 is a schematic cross-sectional view illustrating a backlight module according to an embodiment of the present invention. FIG. 5 is schematic perspective view illustrating the light guide structure of the backlight module as shown in FIG. 4.

As shown in FIGS. 4 and 5, the backlight module 2 comprises a light source 21 and a light guide structure 22. When the light source 21 is enabled, the light source 21 emits a light beam to the light guide structure 22. Moreover, the light beam emitted by the light source 21 is guided by the light guide structure 22.

The light guide structure 22 comprises a plate body 221 and a light-shielding layer 222. In this embodiment, the plate body 221 comprises a light-transmissible plate 2211, a light-guiding plate 2212 and a reflecting plate 2213, which are stacked on each other and sequentially arranged from top to bottom. The light-guiding plate 2212 has a lateral surface 22121. The light-transmissible plate 2211 has a light-transmissible plate lateral surface 22111. The reflecting plate 2213 has a reflecting plate lateral surface 22131. The lateral surface 22121 of the light-guiding plate 2212, the light-transmissible plate lateral surface 22111 and the reflecting plate lateral surface 22131 are collaboratively formed as a plate body lateral surface PS. The plate body lateral surface PS is covered by the light-shielding layer 222. That is, the lateral surface 22121 of the light-guiding plate 2212, the light-transmissible plate lateral surface 22111 and the reflecting plate lateral surface 22131 are all covered by the light-shielding layer 222. The light beam from the light source 21 is blocked by the light-shielding layer 222. Consequently, the light beam will not be exited from the lateral surface 22121 of the light-guiding plate 2212.

In an embodiment, the light-shielding layer 222 is a light-curable ink layer or a heat-curable ink layer. That is, when the material of the light-shielding layer 222 is in an uncured state, the material of the light-shielding layer 222 is flowable. It is noted that the type of the material of the light-shielding layer 222 is not restricted. Preferably but not exclusively, the light-shielding layer 222 is formed on the plate body lateral surface PS by using an ink printing process or a paint spraying process.

The detailed structures of the light guide structure 22 will be described as follows.

Please refer to FIGS. 4 and 5 again. In an embodiment, the light-guiding plate 2212 further comprises a light input surface 22122, a light exit surface 22123 and a bottom surface 22124. The light exit surface 22123 and the bottom surface 22124 of the light-guiding plate 2212 are aligned with each other. The light input surface 22122 is located beside and arranged between the light exit surface 22123, the bottom surface 22124 and the lateral surface 22121 of the light-guiding plate 2212.

In an embodiment, the light source 21 comprises a flexible circuit board 211 and at least one light-emitting element 212. The at least one light-emitting element 212 is installed on the flexible circuit board 211. The at least one light-emitting element 212 is located beside the light input surface 22122. After the light beam emitted by the at least one light-emitting element 212 is introduced into the light-guiding plate 2212 through the light input surface 22122 of the light-guiding plate 2212, the light beam is guided by the light-guiding plate 2212 and exited from the light exit surface 22123.

Please refer to FIG. 5 again. In this embodiment, the appearance of the light guide structure 22 has a rectangular shape. That is, the light input surface 22122 is located at a lateral side of the light guide structure 22, and the lateral surface 22121 of the light-guiding plate 2212 is located at the other three lateral sides of the light-guiding plate 2212 in a U-shaped arrangement. Similarly, the light-transmissible plate lateral surface 22111 and the reflecting plate lateral surface 22131 are U-shaped lateral surfaces. That is, the plate body lateral surface PS composed of the lateral surface 22121 of the light-guiding plate 2212, the light-transmissible plate lateral surface 22111 and the reflecting plate lateral surface 22131 is also a U-shaped lateral surface. After the light-shielding layer 222 is covers the plate body lateral surface PS, the light-shielding layer 222 also has a U-shaped profile.

Please refer to FIGS. 4 and 5 again. The light-transmissible plate 2211 further comprises a light-transmissible plate top surface 22112. The light-transmissible plate top surface 22112 is located beside the light-transmissible plate lateral surface 22111. In addition, the light-transmissible plate top surface 22112 is aligned with the light exit surface 22123 of the light-guiding plate 2212. The reflecting plate 2213 further comprises a reflecting plate bottom surface 22132. The reflecting plate bottom surface 22132 is located beside the reflecting plate lateral surface 22131. In addition, the reflecting plate bottom surface 22132 is aligned with the bottom surface 22124 of the light-guiding plate 2212. As mentioned above, the lateral surface 22121 of the light-guiding plate 2212, the light-transmissible plate lateral surface 22111 and the reflecting plate lateral surface 22131 (i.e., the plate body lateral surface PS) are covered by the light-shielding layer 222. Moreover, in this embodiment, a portion of the light-transmissible plate top surface 22112 and a portion of the reflecting plate bottom surface 22132 are also covered by the light-shielding layer 222. Due to this structural design, the plate body lateral surface PS, the portion of the light-transmissible plate top surface 22112 and the portion of the reflecting plate bottom surface 22132 are covered by the light-shielding layer 222. Consequently, the light guide structure 22 of this embodiment can effectively prevent the light beam from leaking from the lateral surface 22121 of the light-guiding plate 2212. Moreover, since the light guide structure 22 is helpful for increasing the overall structural strength, the light-shielding layer 222 will not be peeled off from the plate body 221.

In the above embodiment, the plate body lateral surface PS, the portion of the light-transmissible plate top surface 22112 and the portion of the reflecting plate bottom surface 22132 are covered by the light-shielding layer 222. It is noted that numerous modifications and alterations may be made while retaining the teachings of the present invention. For example, in another embodiment, only the plate body lateral surface PS is covered by the light-shielding layer 222.

Please refer to FIGS. 4 and 5 again. In an embodiment, the light-shielding layer 222 comprises a lateral part 2221, an upper part 2222 and a lower part 2223. The upper part 2222 of the light-shielding layer 222 is connected with a first end of the lateral part 2221 and extended in the direction toward the plate body 221. The lower part 2223 is connected with a second end of the lateral part 2221 and extended in the direction toward the plate body 221. The first end and the second end of the lateral part 2221 are opposed to each other. In this embodiment, the lateral surface 22121 of the light-guiding plate 2212, the light-transmissible plate lateral surface 22111 and the reflecting plate lateral surface 22131 (i.e., the plate body lateral surface PS) are covered by the lateral part 2221 of the light-shielding layer 222. Moreover, a portion of the light-transmissible plate top surface 22112 is covered by the upper part 2222 of the light-shielding layer 222, and a portion of the reflecting plate bottom surface 22132 is covered by the lower part 2223 of the light-shielding layer 222.

In an embodiment, the width W of each of the upper part 2222 and the lower part 2223 of the light-shielding layer 222 is larger than or equal to 0.1 millimeter and smaller than or equal to 0.25 millimeter. Moreover, the thickness T of each of the lateral part 2221, the upper part 2222 and the lower part 2223 of the light-shielding layer 222 is larger than or equal to 6 micrometers and smaller than or equal to 12 micrometers.

FIGS. 6A to 6E are schematic cross-sectional views illustrating the steps of a manufacturing method of a light guide structure according to an embodiment of the present invention. Please refer to FIGS. 6A to 6E and also refer to FIGS. 4 and 5. The manufacturing method of the light guide structure 2 comprises the following steps.

Figure 6A:
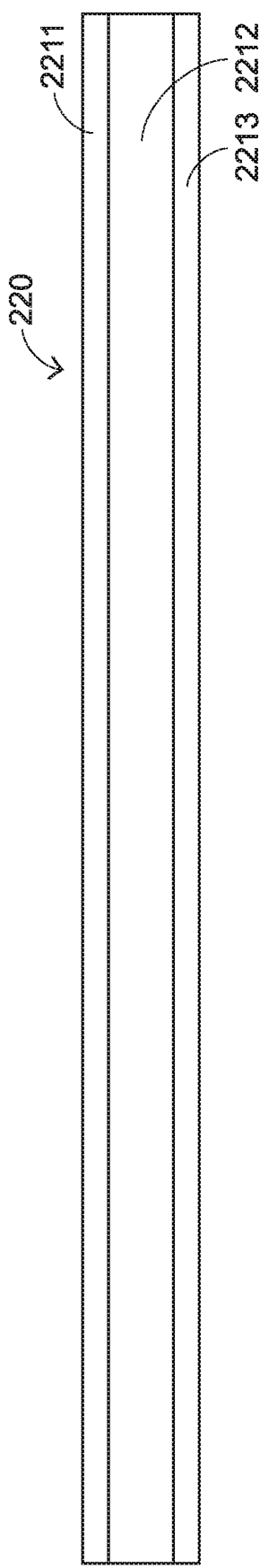
FIGS. 6A to 6E are schematic cross-sectional views illustrating the steps of a manufacturing method of a light guide structure according to an embodiment of the present invention.

Please refer to FIG. 6A. Firstly, a composite plate structure 220 is provided. The composite plate structure 220 comprises a light-transmissible plate 2211, a light-guiding plate 2212 and a reflecting plate 2213, which are stacked on each other and sequentially arranged from top to bottom. That is, before the next step is performed, the light-transmissible plate 2211, the light-guiding plate 2212 and the reflecting plate 2213 that are originally separate components are assembled as the composite plate structure 220.

Figure 6B:
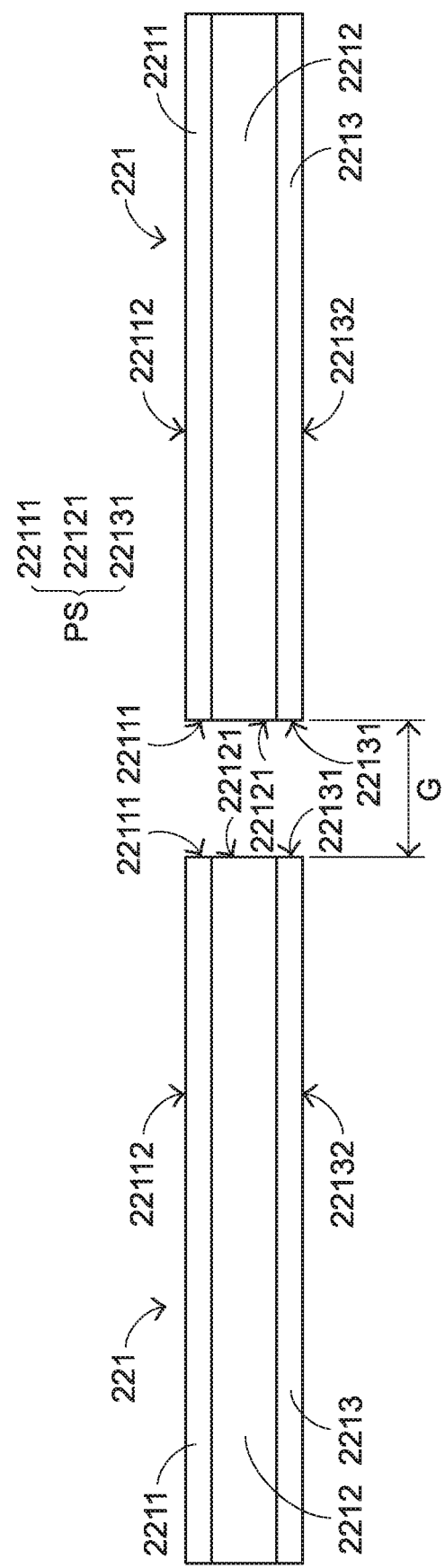

Please refer to FIG. 6B. Then, the composite plate structure 220 is cut into at least two plate bodies 221. Each plate body 221 has a plate body lateral surface PS. There is a gap G between the plate body lateral surfaces PS of every two adjacent plate bodies 221. Each plate body lateral surface PS is defined by a lateral surface 22121 of the light-guiding plate 2212, a light-transmissible plate lateral surface 22111 of the light-transmissible plate 2211 and a reflecting plate lateral surface 22131 of the reflecting plate 2213 collaboratively.

Figure 6C:
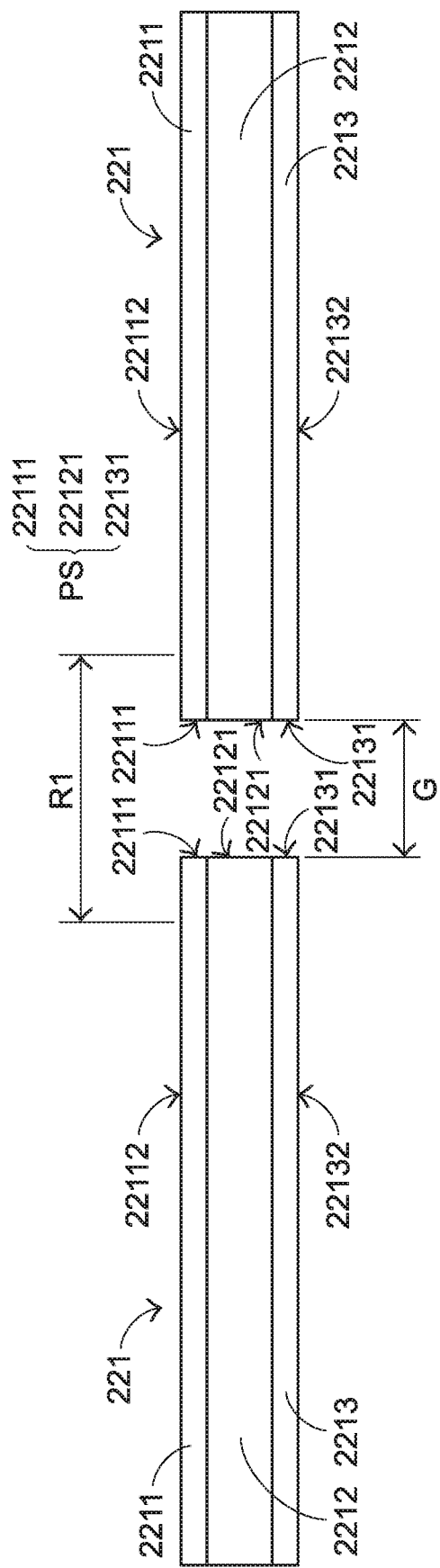

Please refer to FIG. 6C. Then, a light-shielding layer formation region R1 is defined between the plate bodies 221. The light-shielding layer formation region R1 includes the gap G between the plate body lateral surfaces PS of every two adjacent plate bodies 221, a portion of the light-transmissible plate top surface 22112 and a portion of the reflecting plate bottom surface 22132.

Figure 6D:
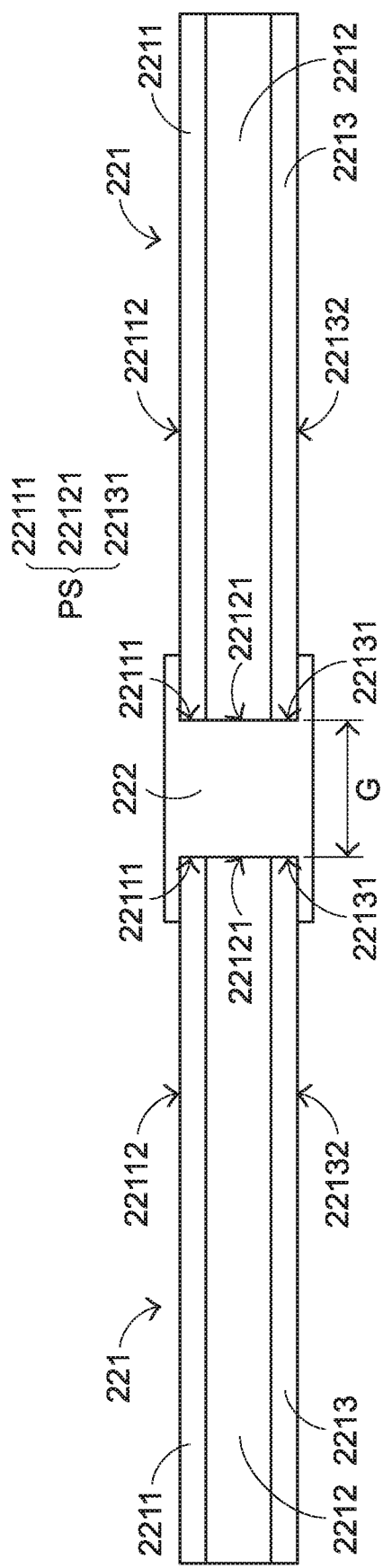

Please refer to FIG. 6D. Then, a light-shielding layer 222 is formed in the light-shielding layer formation region R1 by an ink printing process or a paint spraying process. As mentioned above, the material of the light-shielding layer 222 is flowable before being cured. Consequently, the material of the light-shielding layer 222 flows downwardly and sequentially through the portion of the light-transmissible plate top surface 22112, the plate body lateral surfaces PS and the portion of the reflecting plate bottom surface 22132 until the portion of the light-transmissible plate top surface 22112, the plate body lateral surfaces PS and the portion of the reflecting plate bottom surface 22132 of these plate bodies 221 are completely covered by the material of the light-shielding layer 222. After the material of the light-shielding layer 222 is cured, every two adjacent plate bodies 221 are connected with each other through the cured light-shielding layer 222.

Figure 6E:
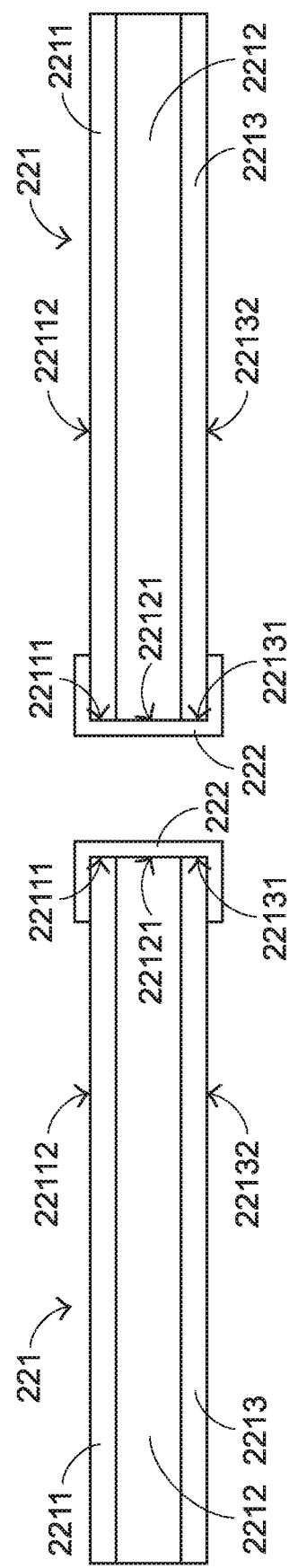

Please refer to FIG. 6E. Then, the portion of the light-shielding layer 222 between every two adjacent plate bodies 221 is cut off. Consequently, the plate bodies 221 are separated from each other. Meanwhile, the plate body lateral surface PS of each plate body 221 is covered by a part of the light-shielding layer 222.

In case that the light-shielding layer 222 needs to be formed on the plate body lateral surfaces PS only and the light-shielding layer 222 is not formed on the portion of the light-transmissible plate top surface 2211 and the portion of the reflecting plate bottom surface 22132, the step of FIG. 6C is modified. That is, the light-shielding layer formation region R1 includes the gap G between the plate body lateral surfaces PS of every two adjacent plate bodies 221 only. Moreover, if the light-shielding layer 222 is formed by using an ink printing process, the light-shielding layer formation region R1 is defined through the use of a black printing screen plate. If the light-shielding layer 222 is formed by using the paint spraying process, the light-shielding layer formation region R1 is defined through the use of a spray shield jig.

In the above embodiment, the composite plate structure 220 is cut into two plate bodies 221 in order to clearly describe the manufacturing method of the light guide structure. In practice, the composite plate structure 220 can be cut into plural plate bodies 221 in an array arrangement at the same time. Then, the subsequent steps as mentioned above are performed to form the light-shielding layer 222 on the plate bodies 221 in an array arrangement. It is noted that the manufacturing method of the light guide structure may be modified according to the practical requirements. For example, in case that the partition illumination effect is required, the manufacturing method of the light guide structure further comprises steps of forming perforations and providing a light blocking structure.

From the above descriptions, the present invention provides the backlight module. The backlight module comprises the light guide structure and the light-shielding layer. The light-shielding layer is formed on the plate body of the light guide structure. In addition, the plate body lateral surface, a portion of the light-transmissible plate top surface and a portion of the reflecting plate bottom surface are covered by the light-shielding layer. Due to this structural design, the light guide structure can effectively prevent the light beam from leaking from the plate body. Moreover, since the light guide structure is helpful for increasing the overall structural strength, the light-shielding layer will not be peeled off from the plate body. In the manufacturing method of the light guide structure, the light-transmissible plate, the light-guiding plate and the reflecting plate are firstly assembled as the composite plate structure and then the subsequent steps are performed. Consequently, the production yield and the production efficiency are largely increased. By using the manufacturing method of the light guide structure, the width of the light-shielding layer can be controlled to be in the range between 0.1 millimeter and 0.25 millimeter, and the thickness of the light-shielding layer can be controlled to be in the range between 6 micrometers and 12 micrometers. Consequently, after the backlight module is installed in an electronic device, the appearance of the electronic device will not be affected by the light-shielding layer of the light guide structure. The backlight module of the present invention can be applied to the components of a keyboard device, a touchpad, a notebook computer or an intelligent appliance that has the illuminating demand.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all such modifications and similar structures.

What is claimed is:

1. A manufacturing method of a light guide structure, the manufacturing method comprising steps of:

providing a composite plate structure, wherein the composite plate structure comprises a light-transmissible plate, a light-guiding plate and a reflecting plate, which are stacked on each other and sequentially arranged from top to bottom;

cutting the composite plate structure into at least two plate bodies, wherein the plate bodies have respective plate body lateral surfaces, and there is a gap between the plate body lateral surfaces of every two adjacent plate bodies, wherein each plate body lateral surface is defined by a lateral surface of the light-guiding plate, a light-transmissible plate lateral surface of the light-transmissible plate and a reflecting plate lateral surface of the reflecting plate collaboratively;

forming a light-shielding layer in the gap, and allowing the light-shielding layer to be covered by the plate body lateral surface of each plate body, so that the at least two plate bodies are connected with each other through the light-shielding layer, wherein the light-shielding layer is a light-curable ink layer or a heat-curable ink layer, wherein before the light-shielding layer is formed in the gap, a light-shielding layer formation region is defined between the plate bodies, and the gap is included in the light-shielding layer formation region, wherein when a material of the light-shielding layer is an uncured state, the material of the light-shielding layer flows to the light-shielding layer formation region, so that the plate body lateral surface of each plate body is covered by the light-shielding layer; and cutting the light-shielding layer, so that the at least two plate bodies are separated from each other and the plate body lateral surface of each plate body is covered by a portion the light-shielding layer.

2. The manufacturing method according to claim 1, wherein the light-guiding plate further comprises a light input surface, a light exit surface and a bottom surface, wherein the light exit surface and the bottom surface of the light-guiding plate are aligned with each other, and the light input surface is located beside and arranged between the light exit surface, the bottom surface and the lateral surface of the light-guiding plate, wherein the light-transmissible plate further comprises a light-transmissible plate top surface, and the light-transmissible plate top surface is located beside the light-transmissible plate lateral surface and aligned with the light exit surface of the light-guiding plate, wherein the reflecting plate further comprises a reflecting plate bottom surface, and the reflecting plate bottom surface is located beside the reflecting plate lateral surface and aligned with the bottom surface of the light-guiding plate, wherein a portion of light-transmissible plate top surface and a portion of the reflecting plate bottom surface are included in the light-shielding layer formation region, wherein when the material of the light-shielding layer is in the uncured state, the material of the light-shielding layer flows to the light-shielding layer formation region, so that the plate body lateral surface, the portion of light-transmissible plate top surface and the portion of the reflecting plate bottom surface in each plate body are covered by the light-shielding layer.

3. The manufacturing method according to claim 1, wherein the light-shielding layer is formed on the plate body lateral surface by using an ink printing process or a paint spraying process.

\* \* \* \* \*